US 008645906B2

(12) United States Patent
Jain et al.

(10) Patent No.: US 8,645,906 B2
(45) Date of Patent: Feb. 4, 2014

(54) METHOD FOR ENFORCING CHANGE POLICY BASED ON PROJECT STATE

(76) Inventors: Sandeep Jain, Palo Alto, CA (US); David Knight, Belmont, CA (US)

( * ) Notice: Subject to any disclaimer, the term of this patent is extended or adjusted under 35 U.S.C. 154(b) by 1112 days.

(21) Appl. No.: 11/852,952

(22) Filed: Sep. 10, 2007

(65) Prior Publication Data

US 2008/0066049 A1    Mar. 13, 2008

Related U.S. Application Data

(60) Provisional application No. 60/844,309, filed on Sep. 12, 2006.

(51) Int. Cl.
*G06F 9/44* (2006.01)

(52) U.S. Cl.
USPC ............ 717/101; 717/120; 717/122; 717/170

(58) Field of Classification Search
None
See application file for complete search history.

(56) References Cited

U.S. PATENT DOCUMENTS

| | | | | |
|---|---|---|---|---|
| 5,490,097 A * | 2/1996 | Swenson et al. | ............... | 703/2 |
| 5,930,801 A * | 7/1999 | Falkenhainer et al. | ............... | 1/1 |
| 6,112,024 A * | 8/2000 | Almond et al. | ............... | 717/122 |
| 6,308,179 B1 * | 10/2001 | Petersen et al. | ............... | 1/1 |
| 6,560,721 B1 * | 5/2003 | Boardman et al. | ............... | 714/33 |
| 6,871,346 B1 * | 3/2005 | Kumbalimutt et al. | ....... | 717/120 |
| 6,993,759 B2 * | 1/2006 | Aptus et al. | ............... | 717/170 |
| 7,123,974 B1 * | 10/2006 | Hamilton | ............... | 717/120 |
| 7,222,131 B1 * | 5/2007 | Grewal et al. | ............... | 717/170 |
| 7,278,106 B1 * | 10/2007 | Mason | ............... | 715/744 |
| 7,421,458 B1 * | 9/2008 | Taylor et al. | ............... | 717/170 |
| 7,451,477 B2 * | 11/2008 | Griffin et al. | ............... | 726/1 |
| 7,512,578 B2 * | 3/2009 | Abnous et al. | ............... | 706/47 |
| 7,555,752 B2 * | 6/2009 | de Groot et al. | ............... | 717/170 |
| 7,631,006 B2 * | 12/2009 | Hagstrom et al. | ............... | 717/101 |
| 7,653,893 B2 * | 1/2010 | Neumann et al. | ............... | 717/101 |
| 7,672,985 B2 * | 3/2010 | Bookman et al. | ............... | 707/755 |
| 7,761,288 B2 * | 7/2010 | Parnell et al. | ............... | 704/2 |
| 7,779,387 B2 * | 8/2010 | Harry et al. | ............... | 717/113 |
| 2002/0059294 A1 | 5/2002 | Bottarelli et al. | | |
| 2002/0116702 A1 * | 8/2002 | Aptus et al. | ............... | 717/170 |
| 2003/0105974 A1 * | 6/2003 | Griffin et al. | ............... | 713/200 |

(Continued)

FOREIGN PATENT DOCUMENTS

| | | |
|---|---|---|
| JP | 03-094331 | 4/1991 |
| JP | 05-216651 | 8/1993 |
| JP | 05-2333238 | 9/1993 |
| JP | 2006-65521 | 3/2006 |

OTHER PUBLICATIONS

Torsten Priebe, et al., "A Pattern System for Access Control", 2004, IFIP Intl' Federation for informatin Processing, 2004, vol. 144/2004, pp. 1-15.*

(Continued)

*Primary Examiner* — Xi D Chen
(74) *Attorney, Agent, or Firm* — Barry Choobin; Patent 360 LLC

(57) ABSTRACT

A set of tools and other mechanisms automatically enforce software development change policies by providing a way to map physical source control system codelines to projects and by providing a way to maintain current project and codeline state information. The set of tools and other mechanisms also provide ways to define change management rules and policies, as well as, ways to evaluate and allow or deny each proposed change against the defined change policy.

16 Claims, 4 Drawing Sheets

(56) References Cited

U.S. PATENT DOCUMENTS

| | | | | |
|---|---|---|---|---|
| 2004/0133444 | A1* | 7/2004 | Defaix et al. | 705/1 |
| 2005/0015675 | A1* | 1/2005 | Kolawa et al. | 714/38 |
| 2005/0223357 | A1* | 10/2005 | Banerjee et al. | 717/120 |
| 2006/0200792 | A1* | 9/2006 | Hagstrom et al. | 717/101 |
| 2006/0206866 | A1* | 9/2006 | Eldrige et al. | 717/122 |
| 2006/0218521 | A1* | 9/2006 | Hagstrom et al. | 717/101 |
| 2006/0236301 | A1* | 10/2006 | Minium et al. | 717/101 |
| 2007/0255715 | A1* | 11/2007 | Li et al. | 707/10 |
| 2008/0059952 | A1* | 3/2008 | Van Huben et al. | 717/120 |
| 2008/0060058 | A1* | 3/2008 | Shea et al. | 726/4 |
| 2008/0066049 | A1* | 3/2008 | Jain et al. | 717/101 |
| 2008/0066050 | A1* | 3/2008 | Jain et al. | 717/120 |
| 2008/0120598 | A1* | 5/2008 | Imeshev | 717/120 |
| 2009/0125128 | A1* | 5/2009 | Eldridge et al. | 717/122 |
| 2009/0144703 | A1* | 6/2009 | Vairavan et al. | 717/122 |

OTHER PUBLICATIONS

Christoph Reichenberger, "VOODOO A Tool for Orthogonal Version Management", 1995, SpringerLink, pp. 62-79.*

Jenny Angier, et al., "Managing Content: Version Control in a Collaborative Workplace", 2005, Management, pp. 18-22.*

Reidar Conradi, "Version Models for Software Configuration Management", 1998, ACM Computing Surveys, vol. 30, No. 2, pp. 232-282.*

Levinson et al., "Pro Visual Studio 2005 Team System", Feb. 2005, A-Press; [retrieved on Jun. 16, 2011]; Retrieved from Internet <URL: http://www.springerlink.com/content/978-1-59059-460-5#section=438111&pae=1&locus=0">; pp. 59-102; 121-157.*

Tichy et al., "RCS A System for Version Control", 1985, published online; [retrieved on Jun. 17, 2011]; Retrieved from Internet <URL:http://www.gnu.org/software/rcs/tichy-paper.pdf>; pp. 1-19.*

Cederqvist et al., "Version Management with CVS", 2005, published online; [retrieved on 5-17-20]; Retrieved fromInternet <URL: http://ftp.gnu.org/non-ngu/cvs/srouce/stable/1..22/cederqvist-1.11.22.pdf>; pp. 1-174.*

Liu, et al., "Role-based authorizations for workflow systems in support of task-based separation of duty", 2003, Elsevier Inc.; [retrieved on Dec. 9, 2012]; Retrieved from Internet <URL:http://www.sciencedirect.com/science/article/pii/S0164121203001754>; pp. 375-387.*

Coughlin, et al., "Mearuing Enforcement Windows with Symbolic Trace Interpretation: What Well-Behaved Programs Say"; 2012 ACM; [retrieved on Sep. 24, 2013]; Retrieved from Internet <URL:http://dl.acm.org/citation.cfm?id=2338965>;pp. 276-286.*

Duakar, "Agile Development: Overcoming a Short-Term Focus in Implementing Best Practices"; 2009 ACM; [retrieved on Sep. 24, 2013]; Retrieved from Internet <URL:http://dl.acm.org/citation.cfm?id=1639950>;pp. 579-587.*

Ren, et al., "Software Configuration Managemetn of Version Control Study Baed on Baseline"; 2010 IEEE; [retrieved on Sep. 24, 2013]; Retrieved from Internet <URL:http://ieeexplore.ieee.org/stamp/stamp.jsp?tp=&arnumber=564861>; pp. 118-121.*

Fischer, et al., "Populating a Release History Database from Version Control and Bug Tracking Systems"; 2003 IEEE; [retrieved on Sep. 25, 2013]; Retrieved from Internet <URL:http://ieeexplore.ieee.org/stamp/stamp.jsp?tp=&arnumber=1235403>; pp. 1-10.*

"Notification of Transmittal of the International Search Report and the Written Opinion of the International Searching Authority, or the Declaration" received in corresponding PCT case International application No. PCT/JUS2007/078293 dated Feb. 19, 2008 (12 pages).

European Search Report received in International Application No. 07842349.8 dated Jan. 7, 2010 (6 pages).

Current claims of International Application No. 07842349.8 dated Jun. 5, 2009 (2 pages).

* cited by examiner

METHOD FOR ENFORCING CHANGE POLICY BASED ON PROJECT STATE

PRIORITY CLAIM

This application claims the benefit of the provisional patent application Ser. No. 60/844,309 filed Sep. 12, 2006, the contents of which are incorporated herein by this reference.

FIELD OF INVENTION

This invention relates to the enforcement of change policies in software development and related disciplines such as Computer Aided Design (CAD).

BACKGROUND

As part of the software development process, organizations define many policies to govern all aspects of the process. This is typically done to protect code quality and the organization's intellectual property. These policies commonly include items such as (1) who can check-in, merge, branch or check-out code from what codelines at various stages of the development process; (2) what kinds of changes (new features, critical bug fixes, etc.) are allowed at various stages of the development process; and (3) what level of review is required for changes into codelines in the various stages of the development process.

Conventionally, these processes are enforced through management oversight. Management oversight usually involves systems that include only very basic access controls to source control systems. In other words, these systems are typically all or nothing in nature: either allowing all authorized users to make changes at a given time or preventing all changes by any user. These simple measures do not allow organizations to automatically enforce more complicated change policies. This lack of enforcement can lead to unauthorized changes being made to sensitive work products. These unauthorized changes can (and often do) lead to system failures which can have large negative economic consequences.

Note that the approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
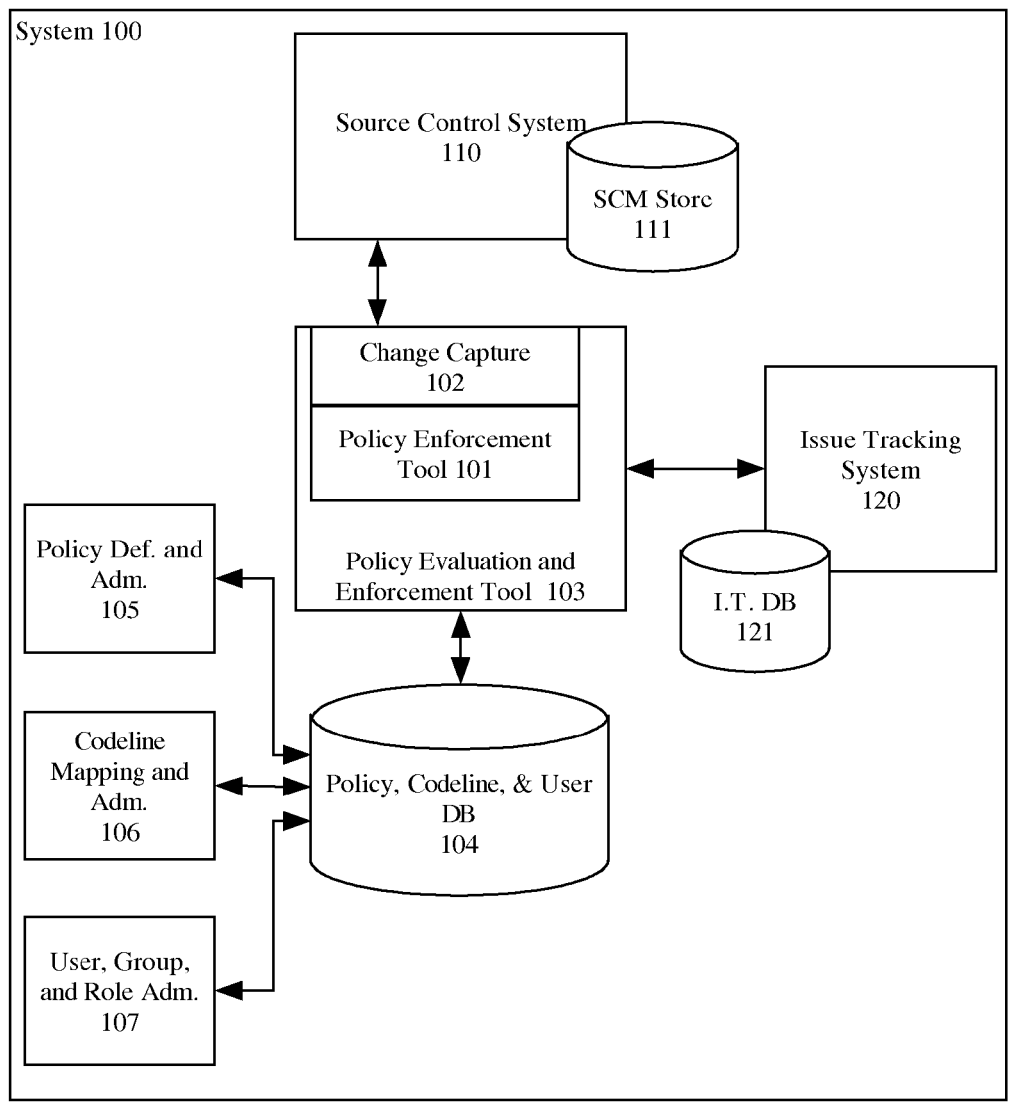
FIG. 1 is a block diagram that illustrates an example operating environment for techniques described herein, according to one embodiment.

In the following description, for the purposes of explanation, numerous specific details are set forth in order to provide a thorough understanding of the present invention. It will be apparent, however, that embodiments of the present invention may be practiced without these specific details. In other instances, well-known structures and devices are shown in block diagram form in order to avoid unnecessarily obscuring embodiments of the present invention.

Functional Overview

In one embodiment, mechanisms provide a simple but highly effective way to automatically enforce policies that control access to code based on the status of a project. These mechanisms allows users to define and enforce those policies at any time during the software development process. The software development process can also be referred to in terms of a lifecycle. Virtually every software development project goes through a project lifecycle. While different organizations use different terms and different numbers of states to define a project lifecycle, most organizations define a lifecycle that begins with formal specification requirements and ends when the software project is decommissioned. A simple, but not atypical, lifecycle of a software project might consist of the following 7 stages: (1) requirements gathering, (2) active development, (3) code complete, (4) code freeze, (5) beta testing, (6) production, and (7) end-of-life. Depending on the organization, a project lifecycle may also include other or different stages.

In one embodiment, at each stage in this process, software development organizations define different policies for what kinds of changes are allowed and by whom. For example, developers assigned to a project may be able to check-in changes at any time during the active development phase. While developers not assigned to the project are restricted from checking-in any changes to the project. As another example, during a code complete phase a policy may be enforced that only allows changes that are meant to fix bugs. As a third example, during a code freeze phase a policy may be implemented so that only changes to bugs of a certain priority level are allowed and, even then, all changes may need to be reviewed by a technical lead before being submitted.

While the above examples are representative of the types of policies used during software development, the actual policies can be much more complex. Moreover, it can be common for these policies to vary significantly at each state in the project lifecycle. Unfortunately, current change management systems, do not allow for automatic policy enforcement based on project state. Hence, in one embodiment, mechanisms automatically enforce policies by providing a way to map physical source control system codelines to projects and a way to maintain current project and codeline state information. In an additional embodiment, mechanisms provide a way to define change management rules and policies, as well as, ways to evaluate and allow or deny each proposed change against the defined change policy.

Policy Enforcement System

FIG. 1 is a block diagram that illustrates example system 100 that performs techniques described herein, according to one embodiment. In other embodiments, system 100 may include a different set of tools and components.

In one embodiment, system 100 includes Policy Enforcement tool 101 that works with Source Control Management (SCM) system 110 and Issue Tracking system 120. An SCM system, such as SCM system 110, can also be referred to as software change management systems. Popular examples of SCM systems include but are not limited to CVS, PVCS, and Perforce.

SCM system 110, in one embodiment, is designed to capture, store and manage access to and provide version control for software source files, designs, and similar files. This information can be stored by SCM system 110 in a repository such as SCM Store 111. Note that SCM Store 111 can be a standard database that maintains information and files related to a software development project. Alternatively, it may be some other type of repository. In addition to a store, SCM system 100 also may include the basic facilities to allow or deny changes to files during the software development process.

Policy Enforcement tool 101 can extends the facilities of SCM system 100 to enforce more sophisticated change policies (for example, those based on codeline state). In one embodiment, Policy Enforcement tool 101 can include a variety of components. Those components can include Change Capture component 102, Policy Evaluation and Enforcement component 103, Policy Database 104, and a set of Policy Definition and Administration components 105, 106, 107. In other embodiments, Policy Enforcement tool 101 may include a different set of tools and components. In addition, note that Policy Enforcement tool 101 and its components may be implemented in a variety of ways. For example, Policy Enforcement tool 101 may be a stand-alone program that includes application programming interface files to implement the various component tasks. Alternatively, Policy Enforcement tool 101 and/or its components may be implemented as dynamic link library files, as separate applications, or as integrated components, for example, of an SCM system.

According to one embodiment, Change Capture component 102 interacts with SCM system 110. Change Capture component 102, in one embodiment, intercepts proposed changes submitted by users to SCM system 110. From the intercepted data, Change Capture component 102 can capture any required information related to the proposed change (e.g., issue ID, or feature Id or enhancement ID) and can, in one embodiment, send a request to Policy Evaluation and Enforcement component 103 to approve the proposed change (e.g., by passing along all relevant details of the proposed change). Eventually, Change Capture component 102 receives a response from Policy Evaluation and Enforcement component 103 either accepting or rejecting the request. Depending on the response, Change Capture component 102 can either accept the proposed change or allow it to proceed into the SCM system or Change Capture component 102 can reject it and provide the user with an appropriate error message.

When Policy Evaluation and Enforcement component 103 receives a proposed change, in one embodiment, it evaluates the proposed change against defined policy enforcement rules. Generally, a proposed change comes as input from Change Capture component 102, but in other embodiments, the proposed change may come from an alternative source. After receiving a proposed change, Policy Evaluation and Enforcement component 103, in one embodiment, retrieves the relevant rule set and other information from Policy Database 104 in order to determine if the proposed change should be accepted. In addition, Policy Evaluation and Enforcement component 103 can also communicate with the Issue Tracking System 120 to validate information gathered by Capture Change component 102 (e.g., issue IDs) and retrieve other relevant information needed to evaluate a rule (such as issue priority). In addition, Policy Evaluation and Enforcement component 103 may use well-known and widely implemented methods for the real-time evaluation of multiple rules.

For example, Policy Evaluation and Enforcement component 103 may include a rules engine which has the capability to process and evaluate rules defined in a standard format.

The set of Policy Definition and Rule Administration components 105, 106, 107 include those components that allow a software development process administrator to define and manage policies, codelines, and user-related information. According to one embodiment, the information defined by these components is stored in a Policy Database 104. These components are discussed in more detail below.

In one embodiment, Policy Database 104 stores policy rules, codeline mappings, as well as, user, group and role information. Policy Database 104 may be implemented using an industry standard relational database management system (RDBMS), although other implementations (e.g., tables, arrays, text files, etc.) would work as well.

As with SCM systems, Policy Enforcement Tool 101 is designed to work with existing Issue Tracking Systems 120. Issue Tracking System 120 can include Issue Tracking Databases 121, which can be a repository that stores known issues related to the software being developed. In one embodiment, Issue Tracking System 120 is used to record and track both tasks that need to be completed for a project as well as open bugs and issues. Common examples of these systems include, but need not be limited to Bugzilla and Team Track.

Mapping Physical Source Control System Codeline to Projects

To enforce policies by project state, in one embodiment, the system maps a physical source system codeline to projects, as well as, defines and maintains the state of these projects and what users or groups are assigned to these projects.

For example, suppose two projects are actively being developed. One project is an application called "Sample App1 V3", which is made up of three modules (module1, module2, and module3). The other project is "Sample App2 V6.1", which consists of four modules (module4, module5, module6, and module7). In this example, Sample App1 V3 is in the "development" phase and Sample App2 V6.1 is in the "Code Freeze" phase. Team 1 is assigned to Sample App1 V3 and Team 2 is assigned to Sample App2 V6.1. To map physical source control system codeline to projects, the SCM system is organized by module, with each module also having its own path in the system and each project having its own branch in the system. Table 1 below shows data that might be stored in the system for each project in this example:

TABLE 1

PROJECT DATA STORED IN AN SCM SYSTEM

| Project Name | Sample App1 V3 | Project Name | Sample App2 V6.1 |
|---|---|---|---|
| State | Development | State | Code Freeze |
| Assigned Users | Team1 | Assigned Users | Team2 |
| BranchID | main.app1.v3 | BranchID | main.app2.v61 |
| Project Content and relative path | | Project Content and relative path | |
| Module1 | \module1 | Module4 | \module4 |
| Module2 | \module2 | Module5 | \module5 |
| Module3 | \module3 | Module6 | \module6 |
| | | Module7 | \module7 |

In Table 1, "State" is a foreign key reference to a table of valid states and "Assigned Users" is a foreign key reference to a table of valid users and groups. For simplicity and clarity other likely variables such as a unique project identifier, a project description, a project owner, and other project metadata have been omitted since they are not referred to in this example.

Based on the information stored in Table 1, when a change is submitted to the system, in one embodiment, the system determines what release/project this particular file belongs to and then checks the current state for that codeline. Based on that determination, system 100, as described herein, can invoke the appropriate set of policies to accept or reject submitted changes.

Defining Change Management Policies

In one embodiment, in addition to mapping codelines to projects, to control when and how changes are made to a project, an administrator uses tools to define change management policies. According to one embodiment, a change management policy consists of the following types of information: (1) a specified type of change that is being requested (e.g., check-in of a particular file or merge of two codelines); (2) a set of variables about the proposed change (e.g., what codeline is being changed, its state, who is making the change etc.); (3) a set of actions that can be taken for each type of change (e.g., accept, reject, notify etc.); and (4) a set of rules that combine the above 3 items to evaluate and process changes.

Defining Types of Proposed Changes

Accordingly, defining a change management policy, in one embodiment, includes first defining what types of changes trigger a rule. According to one embodiment, the changes that could trigger a rule include but are not limited to the following types of changes: (1) check-ins to an SCM system, (2) codeline merges in the SCM system, (3) branching in the SCM system, (4) check-outs from the SCM system, (5) downgrading or deferring of bugs in the bug system, and (6) closing of bugs in the bug system.

Defining Variables Associated with a Proposed Change

Then, in one embodiment, for each of type of proposed change a wide range of variables can be used to help evaluate the proposed change. These variables can include but are not limited to: (1) the user, the user's role (e.g., manager, tech lead, junior programmer etc.), or the group membership of the person attempting to take the action; (2) the product or release the user is attempting to modify; (3) the state of the product or release the user is attempting to modify; (4) a valid work item ID in the issue/bug tracking system; (5) the priority of the work item/bug ID in the issue tracking system; (6) a valid reviewer ID; (7) a valid effort level entry; (8) information about whether a proposed change has passed automated quality assessment tests; (9) arbitrary Boolean operations on any data captured from the source SCM, bug-tracking or other system; (10) the size of the proposed change measured in terms of the # of lines of code changed; (11) the complexity of the code changes as measured by a code analysis tool; and (12) attributes on the particular module changes such as whether it is a critical or performance sensitive module Note that these are examples of the types of variables that may be used to help define a change management policy. Moreover, a proposed change may not need to include every single variable listed above. In fact, in many cases a proposed change utilizes fewer variables. In some cases, a proposed change may include no variables at all.

Defining Supported Actions

Finally, a change management policy might include a wide range of output actions. In one embodiment, the output actions may need to be defined by the administrator so that proposed changes can occur. These actions can include, but are not limited to: (1) allow the change to proceed, (2) reject the change, (3) notify one or more people of the change, and (4) trigger an action on an external system such as the execution of an automated test suite or automated code analysis. In this way, the administrator can control how and when proposed changes occur. In other embodiments, a different set of supported actions may be defined.

By defining the changes that may occur, as well as the variables and actions that may trigger a change, administrators can define change policy rules.

In one embodiment, the change policy rules can be expressed using a variety of well known methods ranging from Boolean expressions to XML-based rules definition languages. Below is "Example Rule 1" expressed as a simple Boolean expression that says that check-ins (the change) to "development" state codelines must have a valid taskID (the variables) or they will be rejected (the action):

If change EQUALS check-in AND codeline_state EQUALS development AND taskID EXISTS THEN ACCEPT ELSE REJECT Example Rule 1

In other embodiments, a change policy definition may include other or different information and/or be in another or different format.

Evaluating and Enforcing Change Policy

Figure 2:
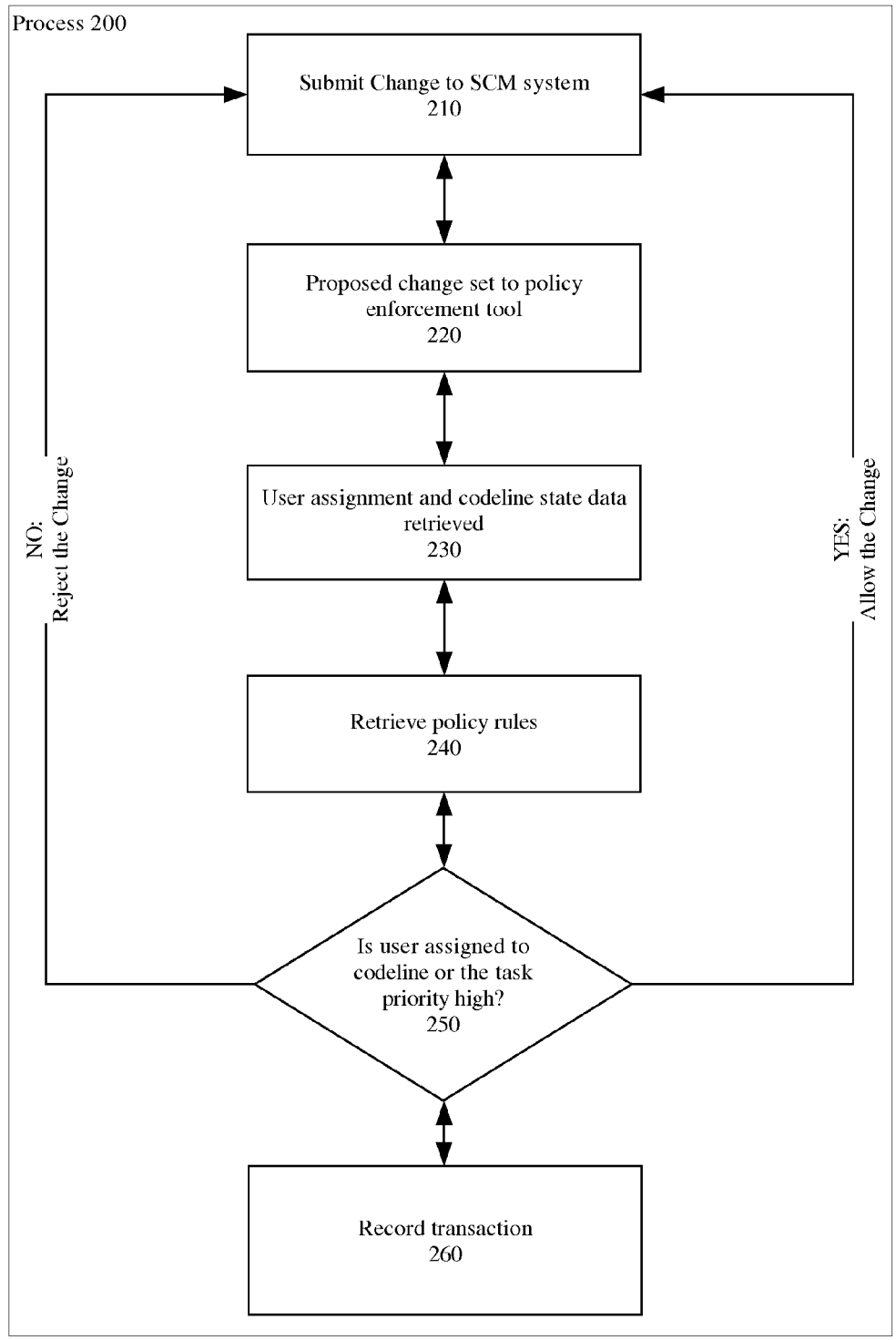
FIG. 2 is a flow diagram that illustrates a process for enforcing policies, according to one embodiment.

According to one embodiment, once codelines are mapped and policies defined, then a change management policy can be enforced in a system. FIG. 2 is a flowchart that outlines process 200 that illustrates how a change policy is evaluated and enforced. Process 200 begins at step 210 with a developer submitting one or more proposed changes to an SCM system, such as SCM system 110 illustrated in FIG. 1.

When the proposed change is submitted, information is captured from the proposed request in order to evaluate whether the change can proceed or not. In one embodiment, the information necessary to evaluate the proposed change includes determining an action (e.g., check-in, merge, etc.) in addition to a set of variables (e.g., files changed, user, taskID etc.). This information (and other information) is captured as part of the evaluation process. The determination can as to what type of action is being made can be determined, in one embodiment, by the SCM system or alternatively by a Policy Enforcement tool. The type of change being requested is generally implicit in the action the user is requesting be taken by the SCM system. Thus, the type of change being requested can be automatically captured by the system based on the request of the user.

Other information can be captured as well. For example, a user submitting a change may have to be authenticated by the SCM system before a change can be submitted. Accordingly, the userID of the requesting user can be automatically captured by the system. This information as well as other variables, such as the names of files being changed, can also be automatically captured by the system as part of the normal change process.

In some cases, variable data, such as the taskID or reviewerID, may be input directly by the user or the user might be prompted to input the data. In one embodiment, some variables such as codeline state can be retrieved from the Policy, User and Group DB. Note that other variables and how those variables are obtained can vary from one implementation to the next.

At step 220, in one embodiment, once the developer has submitted the proposed change and information from the proposed change captured, then, the system sends the captured information (e.g., what files were changed, the userID, the issue ID) to a policy enforcement module. The proposed change, in one embodiment, is not committed to the SCM system at this time, but is held in an "in-process" state. The in-process state indicates that the proposed change is being evaluated.

At step 230, the policy enforcement module receives the proposed changes. Here, according to one embodiment, the system retrieves information in order to be able to evaluate the proposed change and determine if it will be allowed. For example, as discussed above in connection with FIG. 1, the following types of information may be retrieved to evaluate a proposed change: (1) the codeline in which the files with proposed changes reside (this information may be retrieved from a Policy, User and Codeline database); (2) the current status for this codeline (e.g., whether the codeline is in development, code-freeze, production etc.); (3) the project assignments for the developer requesting the change from the Policy, User and Codeline DB; and (4) the priority of the issueID from the Issue Tracking system.

At step 240, once that information has been gathered (e.g., from a Policy, Codeline, and User DB), the policy enforcement tool identifies policy rules which have been defined for the current state of the codeline the developer is attempting to modify. In this example, assume that the codeline is in a "code-freeze" state. Accordingly, the following rules may be retrieved from the DB: (1) only developers assigned to this project are allowed to check-in changes; (2) only changes for "high priority" issues are allowed; and (3) all other changes are rejected.

At step 250, the system evaluates whether the proposed change should be accepted. It does so by comparing the information it retrieved to the rules defined for the current codeline and codeline state. If the change violates any of the rules specified the change is rejected. In addition, the process can terminate and/or an error message may be displayed to the user. If the change does not violate any rules, the system accepts the change and "commits" it to the system.

In one embodiment, at step 260, the details (e.g., the time, date, user, bugID, files changed etc.) of the change are recorded, for example, in a Policy, Codeline, and User and DB to track all changes made to the project.

Rule Definition Process

Figure 3:
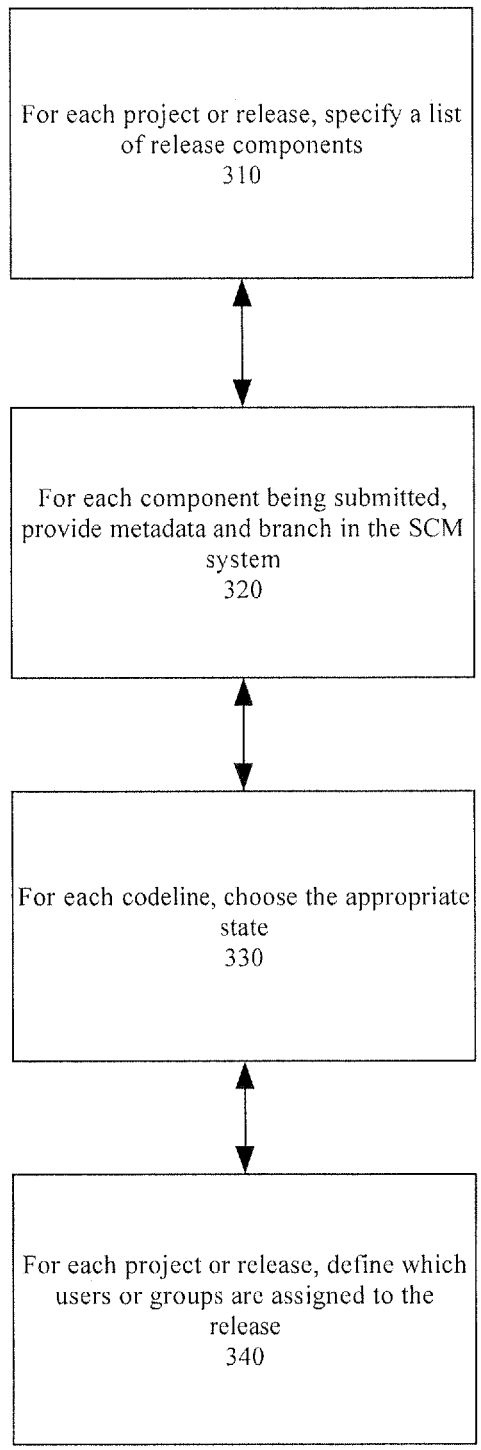
FIG. 3 is a flow diagram that illustrates a method for defining policy rules, according to one embodiment.

As described above, policy rules help define how, when, and by whom proposed changes can be committed to a system. According to one embodiment, policy rules are defined by a user, administrator, developer, etc. FIG. 3 is a flowchart that outlines process 300 for defining a set of policy rules. This process can be performed through a user interface that provides selectable controls that correspond to various rules options or the administrator may define the rules using text, markup text, a template, or some other means.

In one embodiment, process 300 begins with an administrator specifying the list (or at least a partial list) of release components that might be included in the next release (or update) of a project. In one embodiment, the list of release components can be a table in an SCM system, a record in a database, a text file, or some other mechanism that can be used to identify release components. The manner of the administrator uses to identify these components varies, for example, version numbers, file names, file metadata, header information, and other such mechanisms may all be used to identify the components.

Once an administrator has identified the set of release components, at step 320, for each component in the set, the administrator provides metadata such as the name and description of each component, as well as, a "branch" in the SCM system where the files for this component can be located. In this way, the administrator can customize what information is searched for by the various systems and components described herein.

At step 330, for each codeline the administrator chooses the appropriate state the release is in from a set of defined choices. For example, the release may be in a "code-freeze" state, "development" state, etc. By doing so, in one embodiment, the administrator is defining when a proposed change may be submitted to an SCM system.

Then, in one embodiment, at step 340, the administrator defines which users or groups of users are assigned to this release. In this way, the administrator can control who accesses release files at the various stages of a project's lifecycle.

Note that steps discussed above are described as occurring in a particular order. These steps may occur in any order. They may also occur independently of any other steps. In alternative embodiment, defining rules properly may include performing more or less than the steps enumerated above.

Hardware Overview

Figure 4:
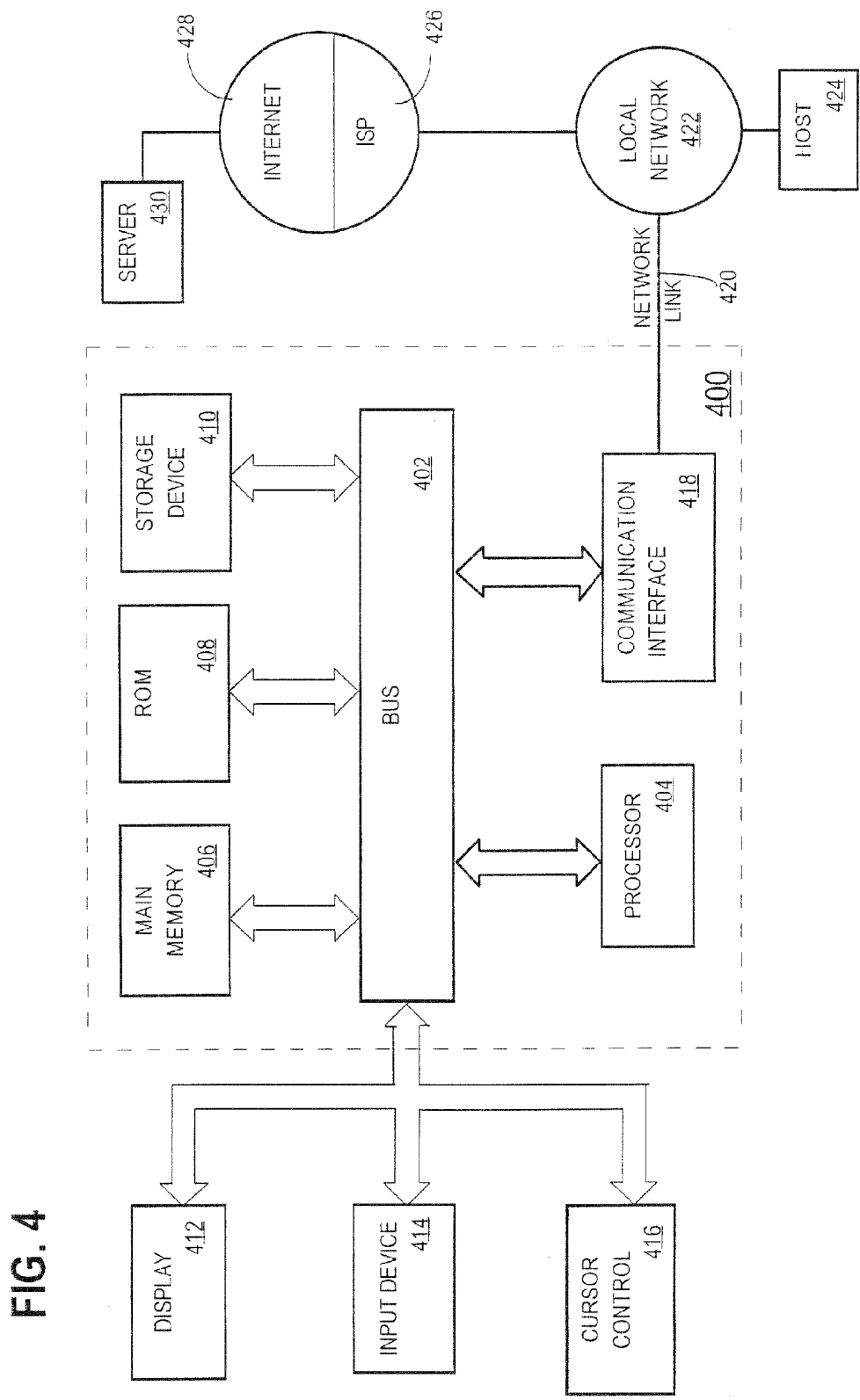
FIG. 4 is a block diagram that illustrates a system upon which embodiments of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one implementation of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative implementations, hard-wired circuitry may be used in place of or in combination with software instructions to implement the invention. Thus, implementations of the invention are not limited to any specific combination of hardware circuitry and software.

The term "computer-readable medium" as used herein refers to any medium that participates in providing data that causes a machine to operation in a specific fashion. In an implementation implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave. In the foregoing specification, implementations of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for enforcing change policies in a software development environment comprises:
    receiving at a source control system a request to make a change to a project; defining a change management role and a policy to evaluate and allow or deny the change based on the defined change management rule and policy automatically and wherein the change management policy consists of a specified type of change that is being requested, a set of variables about the proposed change and a set of actions that is to be taken for each type of change and wherein the change management rule is defined based on the specified type of change, the set of variables and the set of actions, and wherein the specified type of change and the set of variables are captured from an user input or from a policy, user and group database, and wherein the change management policy is enforced automatically by mapping a physical source control system codelines to the project and by maintaining a state of the project with a user or group assigned to the project, and wherein the change management policy includes defining types of changes for triggering a rule, and wherein a release condition to which a particular project belongs is determined from a release management system, and a current state for a codeline is checked from a code review system to invoke an appropriate set of policies to accept or reject changes, when a change is submitted;

before making said changes, retrieving user information associated with a user requesting said changes, and determining a type of the requested change, and wherein said requested change is a first type of change or a second type of change, and wherein the first type of change and the second type of change are different types of changes from a set consisting of a codeline merge in the project, a codeline branch in the project, an addition of one or more features to a set of features that are specified in a data associated with the project, a downgrading or a deferral of one or more bugs in the project and a closing of bugs;

wherein, according to one or more policy rules, a first user is allowed to make the first type of change, and a second user is allowed to make the second type of change but not the first type of change;

based at least in part on the user information and the type of the requested change, evaluating the one or more policy rules to determine if the user is allowed to make the requested change; and in response to evaluating the one or more policy rules, storing said requested change in the source control system when the user is allowed to make the requested change and rejecting said requested change when the user is not allowed to make the requested change; and wherein the method is performed by one or more computing devices;

determining that the first requested change is to a first codeline within the project, when the requested change is a first requested change and a second requested change to a second codeline not within the project is also received, in the request, with the first requested change;

determining a first state of the first codeline and a second state of the second codeline, and wherein according to the one or more policy rules, the user is allowed to make changes to codelines in the first state but not to code lines codelines in the second state, wherein the second state is different than the first state;

wherein evaluating the one or more policy rules to determine if the user is allowed to make the first requested change is further based at least in part on the first state of the first codeline and determining if the user is allowed to make the second requested change based at least in part on the second state of the second codeline.

2. The method of claim 1 further comprises determining a state for said project, and wherein according to the one or more policy rules, the user is allowed to make the requested change when said project has a first state, and the user is not allowed to make the requested change when said project has a second state, and wherein the second state is different than the first state, and wherein evaluating the one or more policy rules to determine if the user is allowed to make the requested change is further based at least in part on the state for said project.

3. The method of claim wherein said project is a first project and wherein the requested change is a first requested change, further comprising:

maintaining a mapping between said first project and a first codeline of said first project, and between a second project and a second codeline of said second project;

determining that the first requested change includes a first change to the first codeline of the first project, wherein a second requested change to a second codeline of the second project is received, in the request, with the first requested change;

in response to the request, mapping the first codeline to said first project and the second codeline to said second project; and determining a first state for said first project and a second state for said second project;

wherein, according to the one or more policy rules, the user is allowed to make changes to projects in the first state but not to projects in the second state, wherein the first state is different than the second state;

wherein evaluating the one or more policy rules to determine if the user is allowed to make the first requested change is further based at least in part on the first state for said first project; and determining if the user is allowed to make the second requested change based at least in part on the second state of the second project.

4. The method of claim 1, wherein, upon receiving the request, the project is in a first state, the method further comprising:

accessing a stored mapping between states and policy rules, wherein the stored mapping maps the first state to a first set of one or more policy rules and a second state to a second set of one or more policy rules, wherein the second set is different from the first set;

wherein, according to the first set of one or more policy rules, the user is allowed to make a particular change to the project when the project is in the first state;

wherein, according to the second set of one or more policy rules, the user is not allowed to make the particular change to the project when the project is in the second state;

wherein evaluating the one or more policy rules to determine if the user is allowed to make the requested change includes evaluating the first set of one or more policy rules;

receiving input that indicates the project is entering the second state, and, in response, automatically:

causing the current state of the project to transition from the first state to the second state; and causing the policy rules that are evaluated to transition from the first set of policy rules to the second set of policy rules.

5. A method comprising:

receiving at a source control system, a request to make a requested change to a project that is currently in a first state;

before making said change:

retrieving user information associated with a user requesting said requested change;

accessing a stored mapping between states and policy rules, wherein the stored mapping maps the first state to a first set of one or more policy rules and a second state to a second set of one or more policy rules, wherein the second set is different from the first set;

wherein, according to the first set of one or more policy rules, the user is allowed to make a particular change to the project when the project is in the first state;

wherein, according to the second set of one or more policy rules, the user is not allowed to make the particular change to the project when the project is in the second state;

based at least in part on the user information and the current state of the project, evaluating the first set of one or more policy rules to determine if the user is allowed to make the requested change; and in response to evaluating the first set of one or more policy rules:

if the user is allowed to make the requested change, storing said requested change in the source control system, and if the user is not allowed to make the requested change, rejecting said requested change;

receiving input that indicates the project is entering the second state, and, in response, automatically:

causing the current state of the project to transition from the first state to the second state; and causing the policy rules that are evaluated to transition from the first set of policy to the second set of policy rules;

wherein the method is performed by one or more computing devices, maintaining a stored mapping between the first project and a first codeline, and between a second project and a second codeline when the project is a first project, and wherein the request requests a first change to the first codeline and a second change to the second codeline;

in response to the request, mapping the first codeline to said first project and the second codeline to the second project, and wherein the second project is in the second state when the first project is in the first state;

evaluating the second set of one or more policy rules to determine if the user is allowed to make the second change;

wherein, according to the first set of one or more policy rules, a first user is allowed to make one or more changes, and a second user is not allowed to make the one or more changes;

determining whether the user is the first user or the second user; and wherein evaluating the first set of one or more policy rules to determine if the user is allowed to make the requested change is further based at least in part on whether the user is the, first user or the second user.

6. The method of claim 5, wherein, according to the first set of one or more policy rules, a first user is allowed to make a first type change and a second user is allowed to make a second type of change but not the first type of change; the method further comprising:

determining a type for each of the requested changes of the requested change, wherein the requested change is a first type of change or a second type of change, wherein the first type of change an change second type of change are different types of change;

wherein evaluating the first set of one or more policy rules to determine if the requested change is allowed is further based at least in part on the type of the requested change and the user requesting the requested change.

7. The method of claim 5, wherein, according to the first set of one or more policy rules, the user is allowed to make a first type of change but not a second type of change; the method further comprising:

determining a type of the requested change, wherein the requested change is a first type of change or a second type of change wherein the first type of change and the second type of change are different types of changes from a set of consisting of:

a codeline merge in the project, a codeline branch in the project, an addition of one or more features to a set of features that are specified in data associated with the project, and a deferral of one or more bugs in the project;

wherein evaluating the first set of one or more policy rules to determine if the requested change is allowed is further based at least in part on the type of the requested change.

8. The method of claim 5, wherein the requested change is a change to a codeline, the method further comprising accessing a stored mapping to determine that the codeline belongs to the project.

9. A non-transitory computer-readable storage medium storing instructions for enforcing change policies in a software development: environment, the instructions including instructions which, when executed by one or more processors, cause the one or more processors to performs the steps of:

receiving at a source control system a request to make a change to a project;

defining a change management rule and a policy to evaluate and allow or deny the change based on the defined change management rule and policy automatically and wherein the change: management policy consists of a specified type of change that is being requested, a set of variables about the proposed change and a set of actions that is to be taken for each type of change and wherein the change management rule is defined based on the specified type of change, the set of variables and the set of actions and wherein the specified type of change and the set of variables are captured directly from the source control system or wherein, the: specified type of change and the set of variables are captured from an user input or from a policy, user and group database and wherein change management policy is enforced automatically by mapping physical source control system codelines to projects and by maintaining a state of the project with a user or group assigned to the project and wherein the change management policy includes defining types of changes for triggering a rule;

before making said change, retrieving user information associated with: a user requesting said change, and determining a type of the requested change, and wherein said requested change is a first type of change or a second type of change, and wherein the first type of change and the second type of change are different types of changes from a: set consisting of a codeline merge in the project, a codeline branch in the project, an addition of one or more features to a set of features that am sped tied in data associated with the project a downgrading or a deferral of one or more bugs in the project and a closing of bugs;

wherein, according to the one or more policy rules, a first user is allowed to make the first type of change, and a second user is allowed to make the second type of change but not the first type of change;

based at least in part on the user information and the type of the requested change, evaluating the one or more policy rules to determine if the user is allowed to make the requested change; and in response to evaluating the one or more policy rules:

if the user is allowed to make the requested change, storing said change in the source control system, and if the user is not allowed to make the requested change, rejecting said requested change;

wherein the requested change is a first requested change, and wherein the instructions, when executed by the one or more processors, further cause the one or more processors to perform;
determining that the first requested change is to a first codeline within the project, and wherein a second requested change to a second codeline not within the project is received, in the request, with the first requested change;
determining a first state of the first codeline and a second state of the second codeline;
wherein, according to the one or more policy rules, the user is allowed to make changes to codelines in the first state but not to codelines in the second state, wherein the second state is different than the first state;
wherein evaluating the one or more policy rules to determine if the user is allowed to make the first requested change is further based at least in part on the first state of the first codeline; and
determining if the user is allowed to make the second requested change based at least in part on the second state of the second codeline.

10. The non-transitory computer-readable storage medium of claim 9, wherein the instructions, when executed by the one or more processors, further cause the one or more processors to perform:
determining a state for said project;
wherein, according to the one or more policy rules, the user is allowed to make the requested change when said project: has a first state, and the user is not allowed to make the requested change when said project has a second state, wherein the second state is different than the first state; and wherein evaluating the one or more policy rules to determine if the user is allowed to make the requested change is further based at least in part on the state for said project.

11. The non-transitory computer-readable storage medium of claim 9, wherein said project is a first project and wherein the requested change is a first requested change, wherein the instructions, when executed by the one or more processors, further cause the one or more processors to perform:
maintaining a mapping between said first project and a first codeline of said first project, and between a second project and a second codeline of said second project;
determining that the first requested change includes a first change to the first codeline of the first project, wherein a second requested change to a second codeline of the second project is received, in the request, with the first requested change;
in response to the request, mapping the first codeline to said first project and the second codeline to said second project; and
determining a first state for said project and a second state for said second project;
wherein, according to the one or more policy rules, the user is allowed to make changes to projects in the first state but not to projects in the second state, wherein the first state is different than the second state;
wherein evaluating the one or more policy rules to determine if the user is allowed to make the first requested change is further based at least in part on the first state for said first project; and
determining if the user is allowed to make the second requested change based at least in part on the second state of the second project.

12. The non-transitory computer-readable medium of claim 9, wherein, upon receiving the request, the project is in a first state, wherein the instructions, when executed by the one or more processors, further cause the one or more processors to perform:
accessing a stored mapping between states and policy rules, wherein the stored mapping maps the first state to a first set of one or more policy rules and a second state to a second set of one of more policy rules,
wherein the second set is different from the first set;
wherein, according to the first set: of one or more policy rules, the user is allowed to make a particular change to the project when the project is in the first state;
wherein, according to the second set of one or more policy rules, the user is not allowed to make the particular change to the project when the project is in the second state;
wherein evaluating, the one or more policy rules to determine if the user is allowed to make the requested change includes evaluating the first set of one or more policy rules;
receiving input that indicates the project is entering the second state, and, in response, automatically:
causing the current state of the project to transition from the first state to The second state; and
causing the policy rules that are evaluated to transition from the first set of policy rules to the second set of policy rules.

13. A non-transitory computer-readable storage medium storing instructions which, when executed by one or more processors, cause the one or more processors to perform the steps of receiving, at a source control system, a request to make a requested change to a project that is currently in a first state;
before making said change:
retrieving user information associated with a user requesting said requested change;
accessing a stored mapping between states and policy rules, wherein the stored mapping maps the first state to a first set of one or more policy rules and a second state to a second set of one or more policy rules,
wherein the second set is different from the first set;
wherein according to the first set of one or more policy rules, the user is allowed to make a particular change to the project when the project is in the first state;
wherein, according to the second set of one or more policy rules, the user is not allowed to make the particular change to the project when the project is in the second state;
based at least in part on the user information and the current state of the project, evaluating the first set of one or more policy rules to determine if the user is allowed to make the requested change; and
in response to evaluating the first set of one or more policy rules:
if the user is allowed to make the requested change, storing said requested change in the source control system, and
if the user is not allowed to make the requested change, rejecting said requested change;
receiving input that indicates the project is entering the second state, and, in response, automatically:
causing the current state of the project to transition from the first state to the second state; and
causing the policy rules that are evaluated to transition from the first set of policy to the second set of policy rules;

wherein the project is a first project, wherein the instructions, when executed by the one or more processors, further cause the one or more processors to perform:
maintaining a stored mapping between the first project and a first codeline, and between a second project and a second codeline;
wherein the request requests a first change to the first codeline and a second change to the second codeline;
in response to the request, mapping the first codeline to said first project and the second codeline to the second project;
wherein the second project is in the second state when the first project is in the first state;
evaluating the second set of one or more policy rules to determine if the user is allowed to make the second change.

14. The non-transitory computer-readable storage medium of claim 13, wherein, according to the first set of one or more policy rules, a first user is allowed, to make one or more changes, and a second user is not allowed to make the one or more changes; wherein the instructions, when executed by the one or more processors, further cause the one or more processors to perform:
determining whether the user is the first user or second user;
wherein evaluating the first: set of one or more policy rules to determine if the user is allowed to make the requested change is finisher based at least in part on whether the user is the first user or the second user.

15. The non-transitory computer-readable storage medium of claim 13, wherein, according to the first set of one or more policy rules, a first user is allowed to make a first type of change, and a second user is allowed to make a second type of change but not the first type of change; wherein the instructions, when executed by the one or more processors, further cause the one or more processors to perform:
determining a type of the requested change, wherein the requested change is a first type of change or a second type of change, wherein the first type of change and the second type of change are different types of changes;
wherein evaluating the first set of one or more policy rules to determine if the requested change is allowed is further based at least in part on the type of the requested change and the user requesting the requested change.

16. The non-transitory computer-readable storage medium of claim 13, wherein, according to the first set of one or more policy rules, the user is allowed to make a first type of change but not a second type of change; wherein the instructions, when executed by the one or more processors, further cause the one or more processors to perform:
determining a type of the requested changes wherein the requested change is a first type of change or a second type of change, wherein the first type of change and the second type of change are different types of changes from a set consisting of:
a codeline merge in the project, a code line branch in the project, an ad it on of one or more features to a set of features that are specified in data associated with the project, and a deferral of one or more bugs in the project;
wherein evaluating the first set: of one or more policy rules to determine if the requested change is allowed is further based at least in part on the type of the requested change.

* * * * *